(12) United States Patent
Chang et al.

(10) Patent No.: US 9,823,512 B2
(45) Date of Patent: Nov. 21, 2017

(54) LIQUID CRYSTAL DISPLAY DEVICE

(71) Applicant: Samsung Display Co., LTD., Yongin, Gyeonggi-Do (KR)

(72) Inventors: Haksun Chang, Yongin (KR); Cheol Shin, Yongin (KR); Kaeun Kim, Yongin (KR); Kichul Shin, Yongin (KR); Sehyun Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 182 days.

(21) Appl. No.: 14/695,831

(22) Filed: Apr. 24, 2015

(65) Prior Publication Data

US 2016/0062189 A1    Mar. 3, 2016

(30) Foreign Application Priority Data

Aug. 28, 2014 (KR) .................. 10-2014-0113351

(51) Int. Cl.
  *G02F 1/1343* (2006.01)
  *G02F 1/1337* (2006.01)
(52) U.S. Cl.
  CPC .......... *G02F 1/133707* (2013.01); *G02F 2001/133742* (2013.01)
(58) Field of Classification Search
  CPC ................................ G02F 1/133707
  See application file for complete search history.

(56) References Cited

U.S. PATENT DOCUMENTS

| 2009/0040407 | A1  | 2/2009  | Kim |
| 2009/0046233 | A1  | 2/2009  | Cho et al. |
| 2009/0279010 | A1* | 11/2009 | Kim ............. G02F 1/133753 349/46 |
| 2011/0242443 | A1  | 10/2011 | Choi et al. |
| 2012/0026438 | A1  | 2/2012  | Choi et al. |
| 2012/0147310 | A1  | 6/2012  | Lee et al. |
| 2012/0206683 | A1  | 8/2012  | Zhang |
| 2012/0223931 | A1  | 9/2012  | Tashiro et al. |
| 2013/0033668 | A1  | 2/2013  | Yao et al. |
| 2013/0242239 | A1  | 9/2013  | Chang et al. |

(Continued)

FOREIGN PATENT DOCUMENTS

| KR | 1020060047023 A | 5/2006 |
| KR | 1020080028565 A | 4/2008 |
| KR | 1020090015243 A | 2/2009 |

(Continued)

*Primary Examiner* — Lucy Chien
(74) *Attorney, Agent, or Firm* — H.C. Park & Associates, PLC

(57) ABSTRACT

A liquid crystal display device includes a first substrate on which a pixel electrode is formed, a second substrate on which a common electrode is formed and a liquid crystal layer disposed between the first substrate and the second substrate. The pixel electrode includes a first plate electrode, a first slit pattern which has a hole formed in the first plate electrode and includes a cross-shaped stem slit and a plurality of branch slits extending in both directions from the stem slit, and a plurality of branch electrodes which protrude from outer side portions of the first plate electrode. The common electrode includes a second plate electrode and a second slit pattern formed in the second plate electrode and including a plurality of holes arranged in a rhombus form.

20 Claims, 11 Drawing Sheets

(56) References Cited

U.S. PATENT DOCUMENTS

2015/0309375 A1 10/2015 Chang et al.

FOREIGN PATENT DOCUMENTS

| KR | 1020090017228 A | 2/2009 |
| KR | 1020110111227 A | 10/2011 |
| KR | 1020120081632 A | 7/2012 |
| KR | 1020130104521 A | 9/2013 |
| KR | 10-2015-0125144 A | 11/2015 |

* cited by examiner

LIQUID CRYSTAL DISPLAY DEVICE

CLAIM OF PRIORITY

This application claims the benefit of Korean Patent Application No. 10-2014-0113351, filed on Aug. 28, 2014, in the Korean Intellectual Property Office, the disclosure of which is incorporated herein in its entirety by reference.

BACKGROUND OF THE INVENTION

Field of the Invention

One or more embodiments of the present invention relate to a liquid crystal display device.

Description of the Related Art

Liquid crystal display devices are one of the most widely used flat panel display devices. A liquid crystal display device generally includes two substrates on which field generating electrodes such as a pixel electrode and a common electrode are respectively formed and a liquid crystal layer disposed between the two substrates. Images are displayed on the liquid crystal display device by generating an electric field in the liquid crystal layer by applying a voltage to the field generating electrodes and thus determining the direction of liquid crystal molecules in the liquid crystal layer and controlling the polarization of incident light thereon.

Liquid crystal display devices may operate in a vertically aligned mode where liquid crystals are driven by using an electric field formed in a vertical direction of the substrates or in an in-plane switching mode where a lateral electric field generated alongside the substrates is used.

Liquid crystal display devices that operate in the vertically aligned mode have an excellent contrast ratio, and attempts to design various pattern electrodes have been undertaken to obtain a wide viewing angle and increase an aperture ratio.

In addition, demands for curved surface display devices have increased nowadays. In this regard, in a bending process for forming a curved surface, misalignment between pattern electrodes formed on upper and lower substrates may occur, which causes unstable texture.

SUMMARY OF THE INVENTION

One or more embodiments of the present invention include a liquid crystal display device that may be used to form a curved panel with reduced unstable texture occurrences due to misalignment.

Additional aspects will be set forth in part in the description which follows and, in part, will be apparent from the description, or may be learned by practice of the presented embodiments.

According to one or more embodiments of the present invention, a liquid crystal display device includes a first substrate on which a pixel electrode is formed, a second substrate on which a common electrode is formed, and a liquid crystal layer disposed between the first substrate and the second substrate. The pixel electrode includes a first plate electrode, a first slit pattern which is a hole formed in the first plate electrode and includes a cross-shaped stem slit and a plurality of branch slits extending in two directions from the stem slit, and a plurality of branch electrodes which protrude from outer side portions of the first plate electrode. The common electrode includes a second plate electrode, and a second slit pattern formed in the second plate electrode and including a plurality of holes arranged in a rhombus form.

The common electrode and the pixel electrode may be disposed such that a central axis of the first slit pattern and a central axis of the second slit pattern match each other.

Holes formed at locations corresponding to corners of the rhombus form from among the plurality of holes may form Y-shapes by further including hole regions which protrude outwards from the rhombus form.

The second slit pattern may include four V-shaped holes respectively formed at locations corresponding to four corners of the rhombus form.

At least one of the four V-shaped holes may form a Y-shape by further including a hole region which protrudes outwards from the rhombus form.

The first substrate and the second substrate may be curved to form a curved display surface.

The common electrode and the pixel electrode may be formed such that a central axis of the second slit pattern and a central axis of the first slit pattern match each other in a central area of the display surface, and, the central axis of the second slit pattern and the central axis of the first slit pattern are separated from each other by a predetermined distance in both sides of a circumference area of the display surface.

Directions of the predetermined distance at the both sides of the circumference area of the display surface may be opposite to each other.

A direction of the predetermined distance in which the central axis of the second slit pattern is spaced with respect to the central axis of the first slit pattern may be right in a left side of the circumference area of the display surface, and a direction of the predetermined distance in which the central axis of the second slit pattern is spaced with respect to the central axis of the first slit pattern may be left in a right side of the circumference area of the display surface.

The predetermined distance may gradually increase as a location of the predetermined distance goes from the central area of the display surface to the both sides of a circumference area of the display surface.

According to one or more embodiments of the present invention, a liquid crystal display device includes a first substrate on which a pixel electrode is formed, a second substrate on which a common electrode is formed, and a liquid crystal layer disposed between the first substrate and the second substrate. The pixel electrode includes a slit pattern which includes a cross-shaped stem slit and a plurality of branch slits extending in two directions from the stem slit and disposed alternately with respect to the stem slit, and the common electrode includes a plate electrode without hole patterns.

A central portion of the cross-shaped stem slit may have a rhombus shape.

The branch slits may be equal to or less than about 35 μm in length.

A shape formed by connecting end portions of the branch slits may be a quadrilateral shape.

A shape formed by connecting end portions of the branch slits may be a chamfered quadrilateral shape.

The slit pattern may be formed in a plurality of numbers and the plurality of slit patterns may be arranged in a matrix shape.

Distances between pluralities of branch slits that face each other in the adjacent slit patterns may increase as the distances go from central portions of the slit patterns to circumferential portions of the slit patterns.

The first substrate and the second substrate may be curved to form a curved display surface.

According to one or more embodiments of the present invention, a liquid crystal display device includes a pixel electrode formed on a first substrate, a common electrode formed on a second substrate, a liquid crystal layer disposed between the first substrate and the second substrate. The pixel electrode may include a first plate electrode, a first slit pattern penetrating the first plate electrode and including a cross-shaped stem slit and a plurality of branch slits, and a plurality of branch electrodes protruding from outer portions of the first plate electrode. The cross-shaped stem slit may include a first portion extending along a first direction and a second portion extending along a second direction and intersected by the first portion at a center of the cross-shaped stem slit. The plurality of branch slits may extend from the cross-shaped stem slit in diagonal directions of the cross-shaped stem slit. The common electrode may include a second plate electrode, and a second slit pattern penetrating the second plate electrode and including a plurality of holes arranged in a rhombus form. The plurality of holes may include first and second holes respectively disposed at opposite corners of the rhombus form. At least one of the first and second holes may overlap the first portion of the cross-shaped stem slit. The liquid crystal display device may have a curved display surface by bending the first and second substrates along a direction substantially parallel to the second direction.

A distance of the opposite corners of the rhombus form may be less than a length of the first portion of the cross-shaped stem slit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
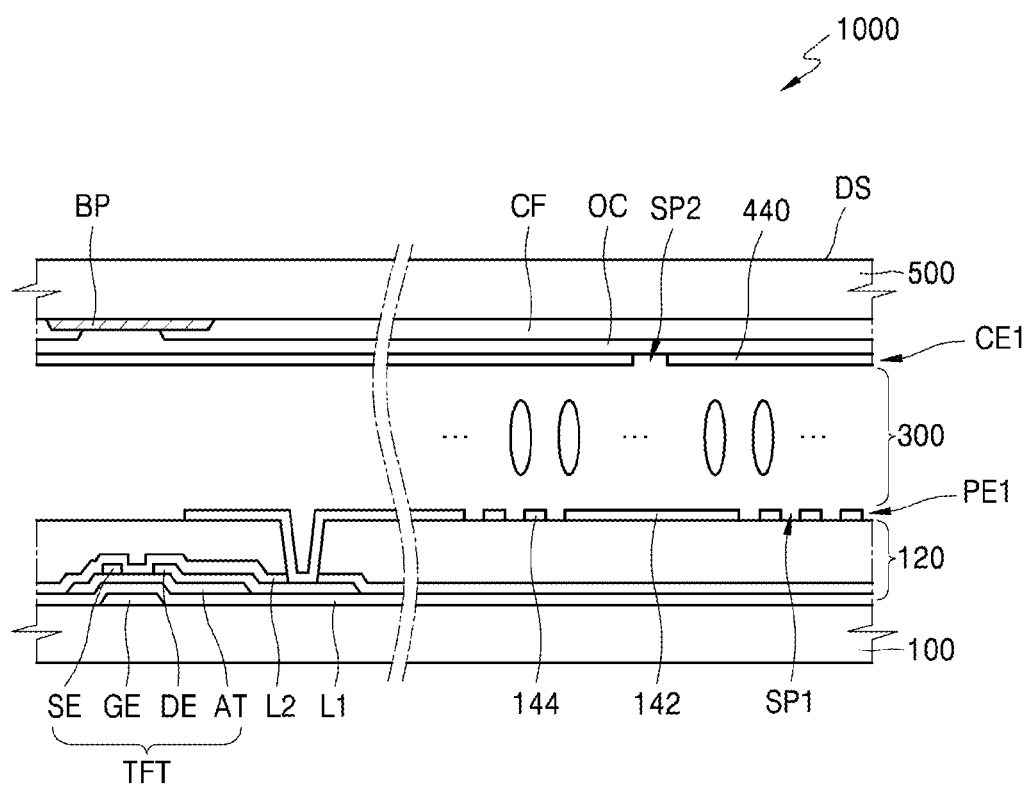
FIG. 1 is a schematic cross-sectional view of a liquid crystal display device according to an embodiment of the present invention.

As the invention allows for various changes and numerous embodiments, exemplary embodiments will be illustrated in the drawings and described in detail in the written description. The effect and feature of the present invention and the method of accomplishing the same will become apparent from the following description of the embodiments in detail, taken in conjunction with the accompanying drawings. This invention may, however, be embodied in many different forms and should not be construed as limited to the exemplary embodiments set forth herein.

Hereinafter, the present invention will be described in detail with reference to the accompanying drawings, in which exemplary embodiments of the invention are shown. Like reference numerals in the drawings denote like elements, and thus their repeated description will be omitted.

While such terms as "first" and "second" may be used to describe various components, such components must not be limited to the above terms. The above terms are used only to distinguish one component from another.

As used herein, the singular forms "a," "an," and "the" are intended to include the plural forms as well, unless the context clearly indicates otherwise.

It will be further understood that the terms such as "including," "comprising," and "having" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

Expressions such as "at least one of," when preceding a list of elements, modify the entire list of elements and do not modify the individual elements of the list.

Figure 2:
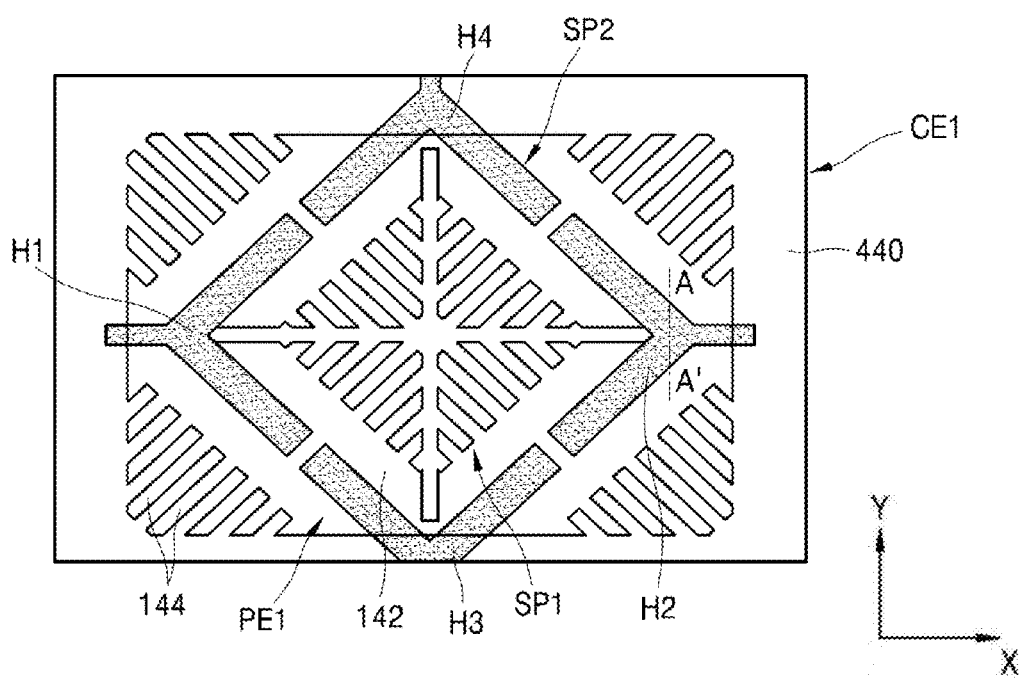
FIG. 2 is a plan view that illustrates in detail an electrode structure of the liquid crystal display device of FIG. 1.
Figure 3A:
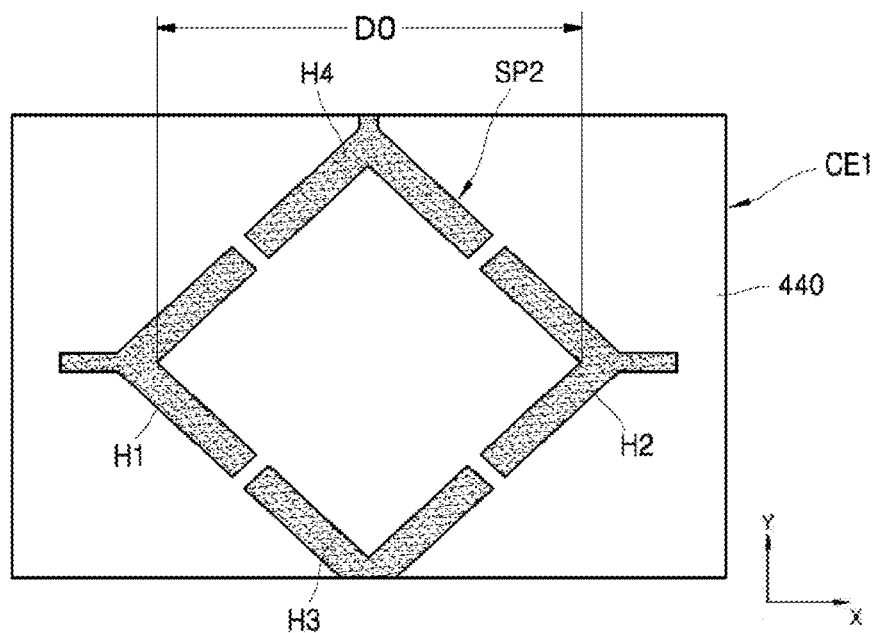
FIGS. 3A and 3B are respectively plan views of a common electrode and a pixel electrode of FIG. 2.
Figure 3B:
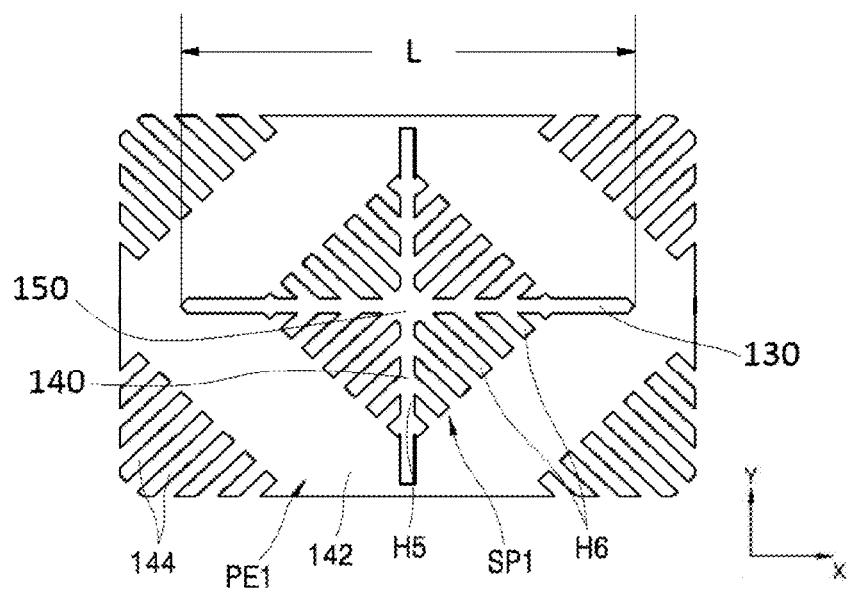

FIG. 1 is a schematic cross-sectional view of a liquid crystal display device 1000 according to an embodiment of the present invention. FIG. 2 is a plan view that illustrates in detail an electrode structure of the liquid crystal display device 1000 of FIG. 1. FIGS. 3A and 3B are plan views of a common electrode CE1 and a pixel electrode PE1 of FIG. 2 respectively.

The liquid crystal display device 1000 includes a first substrate 100 on which the pixel electrode PE1 is formed, a second substrate 500 on which the common electrode CE1 is formed, and a liquid crystal layer 300 disposed between the first substrate 100 and the second substrate 500.

The liquid crystal display device 1000 according to the present embodiment operates in a vertically aligned mode where liquid crystals are driven by using an electric field formed in a vertical direction of the first and second substrates 100 and 500, and more particularly, in a patterned vertical alignment (PVA) mode where fine slit patterns are formed in the pixel electrode PE1 and the common electrode CE1 to obtain a wider viewing angle.

The pixel electrode PE1 and the common electrode CE1 will be described in detail below.

The pixel electrode PE1 includes a first plate electrode 142, and a first slit pattern SP1 which is a hole formed in the first plate electrode 142. The first slit pattern SP1 includes a cross-shaped stem slit H5, and a plurality of branch slits H6 extending in two directions, for example, diagonal directions of the cross-shaped stem slit H5, from the stem slit H5. Also, a plurality of branch electrodes 144 which protrude from the first plate electrode 142 are formed in outer side portions of the first plate electrode 142. The cross-shaped stem slit H5 includes a first portion 130 extending along a first direction X and a second portion 140 extending along a second direction Y and intersected by the first portion 130 at a center 150 of the cross-shaped stem slit H5. The first portion 130 of the cross-shaped stem slit H5 has a length of L.

The common electrode CE1 includes a second plate electrode 440, and a second slit pattern SP2 which is a hole formed in the second plate electrode 440. The second slit pattern SP2 includes a plurality of holes H1, H2, H3, and H4 arranged in a rhombus form. As shown in FIGS. 2 and 3A, the first hole H1, second hole H2, third hole H3 and fourth hole H4 may respectively include corners of the rhombus form. The first through fourth holes H1, H2, H3, and H4 may be V-shaped, and the first hole H1 and the second hole H2 may further include hole regions which protrude outwards from the rhombus form, thereby forming Y-shapes. A distance D0 of opposite corners of the rhombus form, where the first and second holes H1 and H2 are located, respectively, may be less than the length L of the first portion 130 of the cross-shaped stem slit H5.

As such, a region of the liquid crystal layer 300 is partitioned into multiple domains by forming the fine slits in the pixel electrode PE1 and the common electrode CE1. As, a lateral electrical field may be formed by the fine slits, liquid crystal molecules within one domain incline in the same direction. By dispersing directions evenly in which the liquid crystal molecules incline in the multiple domains, a wide viewing angle may be obtained.

Meanwhile, the fine slits may cause unstable texture. Particularly, when misalignment occurs during a manufacturing process, an unintended strong fringe field and resulting regions where liquid crystal directors clash with each other cause the occurrence of unstable texture.

In the liquid crystal display device 1000 according to the present embodiment, the pixel electrode PE1 and the common electrode CE1 have the structures described above such that the occurrence of unstable texture may be reduced.

Figure 4:
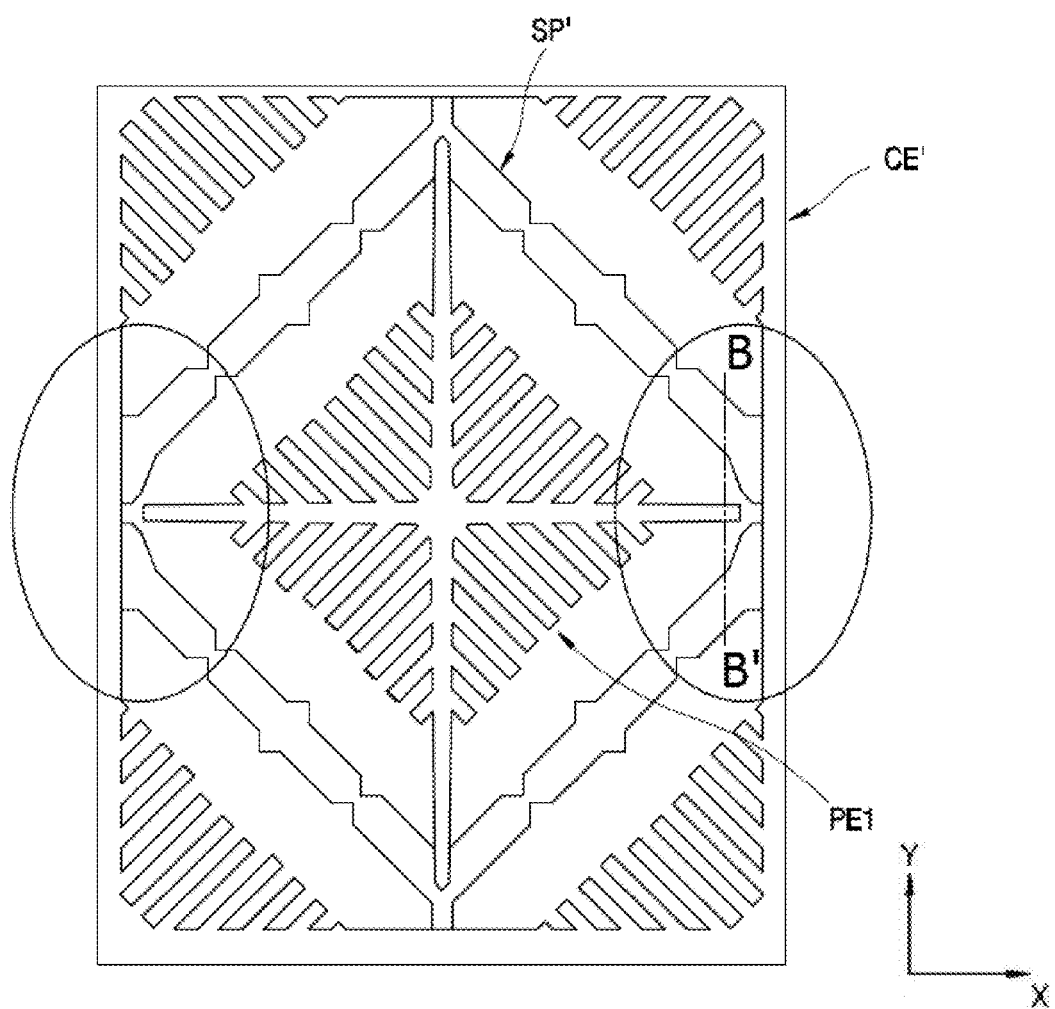
FIG. 4 is a detailed plan view of an electrode structure according to a comparative example of the liquid crystal display device.
Figure 5:
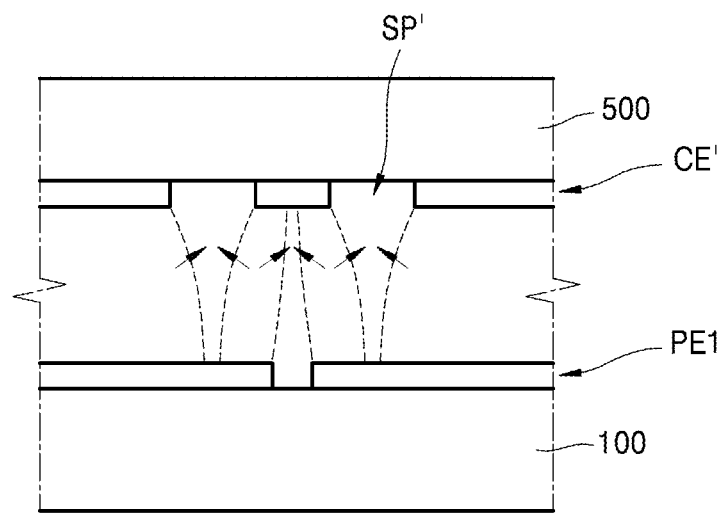
FIG. 5 is a partial cross-sectional view taken along a line B-B' of FIG. 4.

FIG. 4 is a detailed plan view of an electrode structure according to a comparative example of a liquid crystal display device, and FIG. 5 is a partial cross-sectional view taken along a line B-B' of FIG. 4.

The electrode structure according to the comparative example has a different slit pattern SP' formed in a common electrode CE' from the second slit pattern SP2 formed in the common electrode CE1 according to the present embodiment.

In the illustrated structure, frequent unstable textures occur particularly in the marked regions. The phenomenon may be explained based on the cross-sectional view of FIG. 5. Referring to FIG. 5, a strong fringe field may occur in regions where fine slits respectively formed in a pixel electrode PE1 and the common electrode CE' are concentrated, and thus liquid crystal directors may clash with each other. Also, an unstable texture may considerably increase even when a light misalignment occurs between the first substrate 100 and the second substrate 500.

In the liquid crystal display device 1000 according to the present embodiment, the common electrode CE1 has the structure described above such that the sensitivity that appears in the electrode structure of the comparative example may be reduced.

Figure 6:
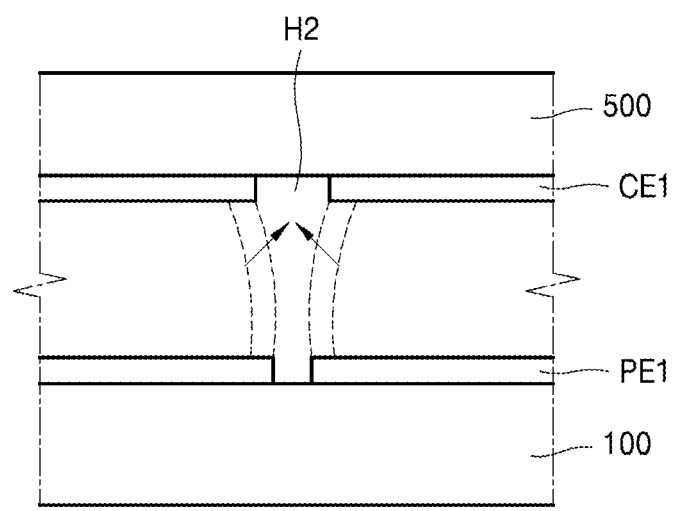
FIG. 6 is a partial cross-sectional view taken along a line A-A' of FIG. 2.

FIG. 6 is a partial cross-sectional view taken along a line A-A' of FIG. 2.

FIG. 6 illustrates a region where the fine slits formed in the common electrode CE1 and the pixel electrode PE1 face each other. In the illustrated region, the liquid crystal molecules may clash with each other compared to other regions. However, as the second slit pattern SP2 formed in the common electrode CE1 is simplified, unstable texture occurrences may decrease. Also, a rate of increase of unstable textures due to misalignment between the first substrate 100 and the second substrate 500 may decrease.

Referring to FIG. 1 again, the structure of the liquid crystal display device 1000 will be described in more detail.

A thin film transistor array layer 120 and the pixel electrode PE1 are formed on the first substrate 100. The thin film transistor array layer 120 includes a plurality of switching devices TFTs. The thin film transistor array layer 120 also includes a plurality of gate lines (not shown) and a plurality of data lines (not shown).

The first substrate 100 may be a glass substrate, or a plastic substrate including polyethylen terephthalate (PET), polyethylen naphthalate (PEN), and polyimide.

Each of the switching devices TFTs includes an active layer AT, a gate electrode GE, a source electrode SE, and a drain electrode DE.

A first insulating layer L1, which is a gate insulating layer, is formed on the gate electrode GE, and the active layer AT is formed on the first insulating layer L1. The source electrode SE and the drain electrode DE are spaced apart from each other on the active layer AT, and a second insulating layer L2 is formed thereon that covers the source electrode SE and the drain electrode DE.

The active layer AT may include various materials. For example, the active layer AT may include inorganic semiconductor materials such as amorphous silicon or crystalline silicon. In some embodiments, the active layer AT may include oxide semiconductors. Alternately, the active layer AT may include organic semiconductor materials.

The gate electrode GE, the source electrode SE, and the drain electrode DE may each include at least one metal selected from aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu) and may each be formed as a single layer or a multi-layer.

The first insulating layer L1 and the second insulating layer L2 may be formed of various insulating materials. The first insulating layer L1 and the second insulating layer L2 may include at least one insulating layer selected from $SiO_2$, $SiNx$, $SiON$, $Al_2O_3$, $TiO_2$, $Ta_2O_5$, $HfO_2$, $ZrO_2$, BST and PZT and may be formed as a single layer or a multi-layer.

The pixel electrode PE1 is formed on the thin film transistor array layer 120 so as to be connected with the switching devices TFT. An alignment layer, not shown, may be further formed on the pixel electrode PE1.

A blocking pattern BP, a color filter CF, an over coating OC and the common electrode CE1 are formed on the second substrate 500. Also, another alignment layer which is not illustrated may be further formed on the second substrate 500. The second substrate 500 may be a glass substrate or a transparent plastic substrate, and an external surface of the second substrate 500 is a display surface DS.

The blocking pattern BP is disposed on the second substrate 500 at a position corresponding to a region where the gate lines and the data lines, not shown, and the switching devices TFT are formed and blocks light. The position where the blocking pattern BP is disposed is just an example, and the blocking pattern BP may be disposed on the first substrate 100.

The color filter CF is disposed on the second substrate 500 and filters color light. However, this is just an example, and the color filter CF may be disposed on the first substrate 100.

The over coating OC is disposed on the second substrate 500 where the color filter CF is formed in order to planarize an upper surface of the second substrate 500. However, the over coating OC may be omitted.

The common electrode CE1 is disposed on the second substrate 500 to face the pixel electrode PE1, and a reference voltage for defining a polarity of a voltage applied to the pixel electrode PE1, that is, a common voltage, is applied to the common electrode CE1.

The liquid crystal layer 300 includes liquid crystal molecules, and the liquid crystal molecules may be aligned in a vertical direction when no voltage is applied between the common electrode CE1 and the pixel electrode PE1, that is, when no electrical field is formed in the liquid crystal layer 300. In other words, the liquid crystal molecules may have a negative dielectric constant anisotropy.

Polarizing plates may be further disposed on external surfaces of the first substrate 100 and the second substrate 500, and polarization axes thereof may cross at right angles. However, the present embodiment is not limited thereto.

As the liquid crystal display device 1000 includes the common electrode CE1 and the pixel electrode PE1 as illustrated in FIGS. 3A and 3B, occurrences of unstable texture are reduced and also a rate of increase of unstable texture due to misalignment decreases.

Figure 7:
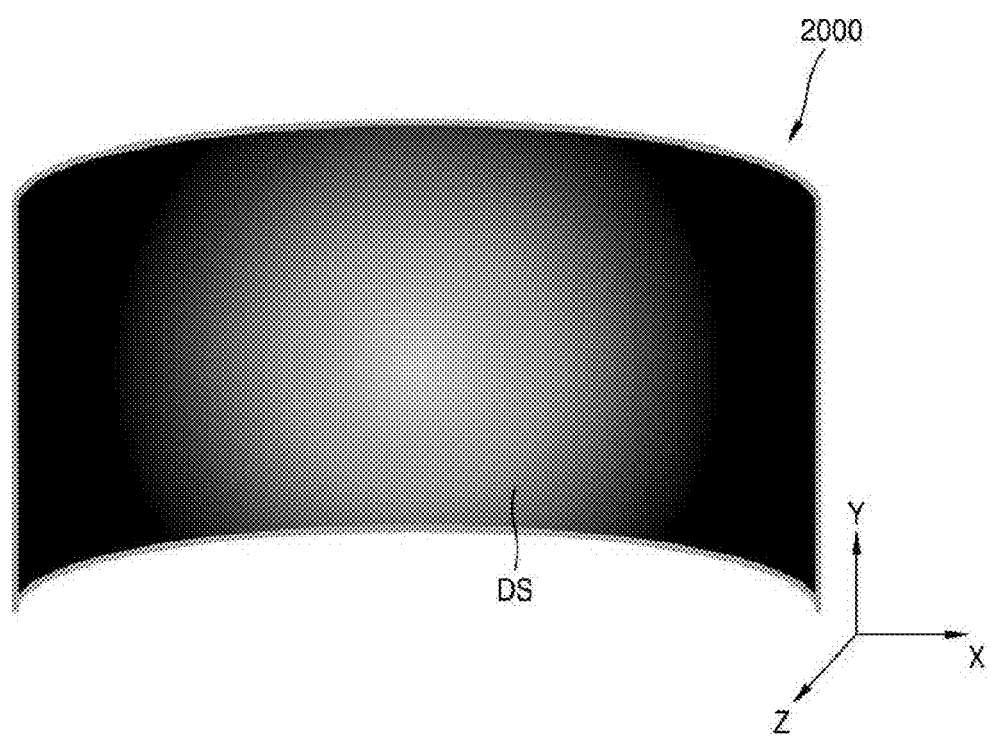
FIG. 7 schematically illustrates an external appearance of a liquid crystal display device according to another embodiment of the present invention.

FIG. 7 schematically illustrates an external appearance of a liquid crystal display device 2000 according to another embodiment of the present invention.

The liquid crystal display device 2000 according to the present embodiment differs from the liquid crystal display device 1000 of FIG. 1 in that it appears as a curved panel and includes a curved display surface DS. Only the external appearance of the liquid crystal display device 2000 including the curved display surface DS is shown in FIG. 7. Detailed components of the liquid crystal display device 2000 are substantially the same as those of FIG. 1, and therefore the components will be described by using the same terminology as used with respect to FIG. 1.

The curved panel may be manufactured by bending a liquid crystal display device like the liquid crystal display device 1000 of FIG. 1. During bending, misalignment may occur between the first substrate 100 and the second substrate 500 as the first substrate 100 and the second substrate 500 have different curving degrees from each other. However, as described above, since the liquid crystal display device 1000 has the common electrode CE1 and the pixel electrode PE1 designed to reduce the increase of unstable texture due to misalignment, the liquid crystal display device 1000 is suitable for forming a curved display surface.

Figure 8A:
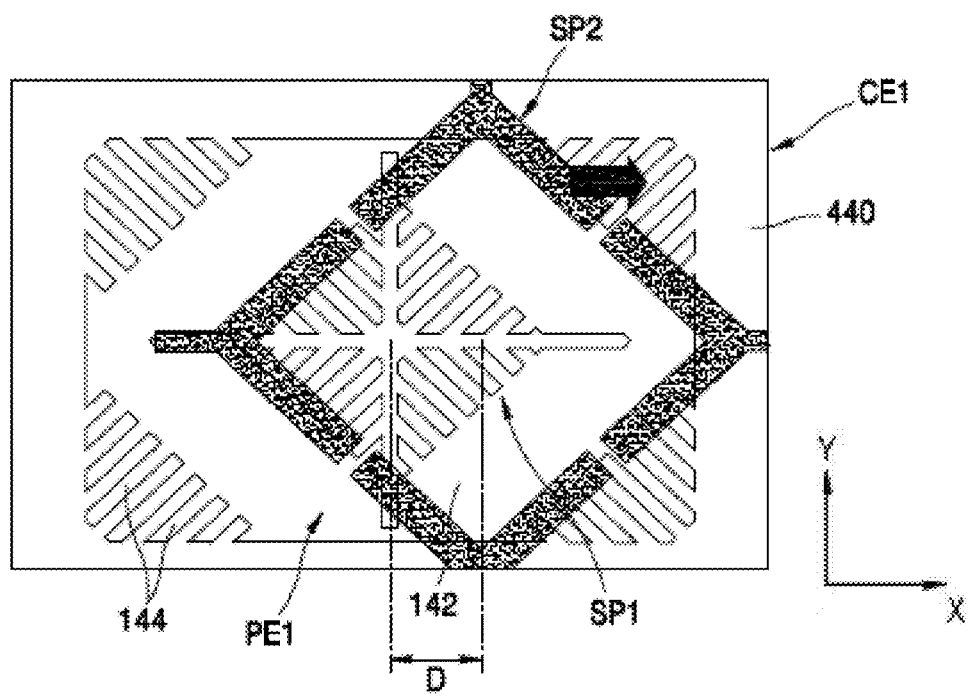
FIGS. 8A through 8C are detailed plan views of electrode patterns at locations respectively corresponding to a left side, center side, and right side of a display surface, which may be employed in the liquid crystal display device of FIG. 7 respectively.
Figure 8B:
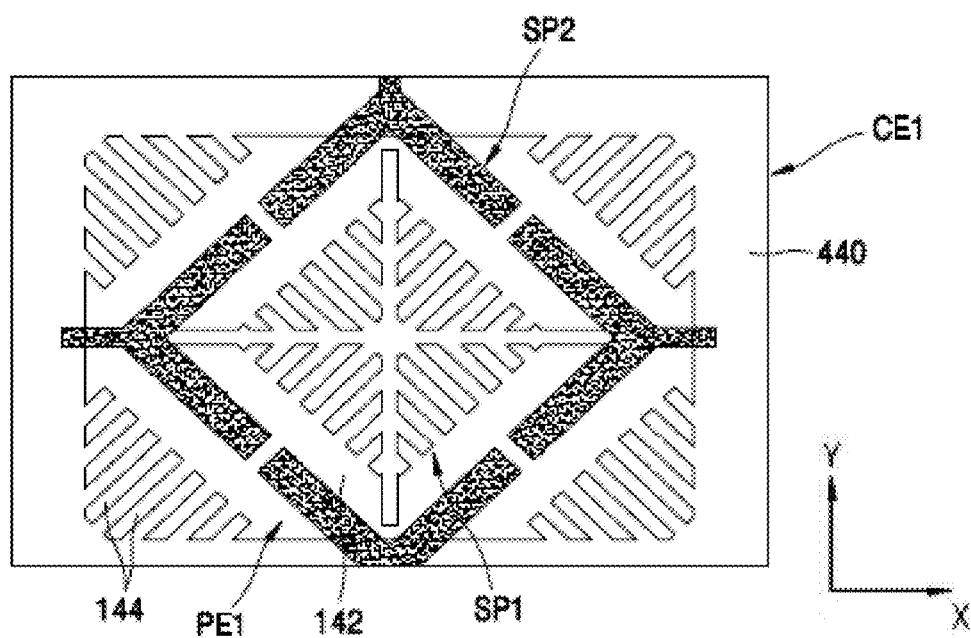
Figure 8C:
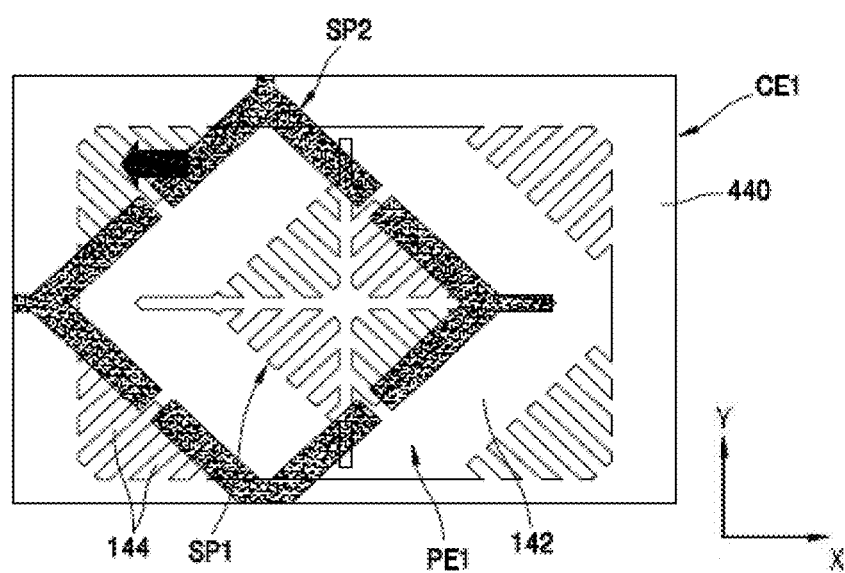

FIGS. 8A through 8C are detailed plan views of electrode patterns at locations respectively corresponding to a left side, a center side, and a right side of the display surface DS, which may be employed in the liquid crystal display device 2000 of FIG. 7 respectively.

Regarding the electrode patterns, a direction of misalignment which may occur when forming a curved panel has been already taken into consideration.

When the curved panel is formed, both left and right ends of the display surface DS are curved toward a viewer's side by bending the corresponding portions of the first and second substrates 100 and 500 along a direction substantially parallel to the second direction Y. At the left side of the display surface DS, the second substrate 500 on which the common electrode CE1 is formed is misaligned to the left, and at the right side of the display surface DS, the second substrate 500 on which the common electrode CE1 is formed is misaligned to the right.

Accordingly, to offset this misalignment, a method of initially misaligning the common electrode CE1 and the pixel electrode PE1 at left and right sides of a panel, that is, in directions opposite the misalignment that occurs during bending, is used.

FIG. 8A illustrates how the common electrode CE1 and the pixel electrode PE1 are disposed in a left area of the display surface DS. The common electrode CE1 is spaced to the right with respect to the pixel electrode PE1. That is, a central axis of a second slit pattern SP2 formed in the common electrode CE1 is moved to the right by a distance D from a central axis of a first slit pattern SP1.

FIG. 8B illustrates how the electrodes CE1 and PE1 are disposed in a central area of the display surface DS. Since misalignment rarely takes place around the center area of the display surface DS when forming the curved panel, the common electrode CE1 and the pixel electrode PE1 are disposed such that the central axis of the second slit pattern SP2 formed in the common electrode CE1 matches the central axis of the first slit pattern SP1.

FIG. 8C illustrates how the electrodes CE1 and PE1 are disposed in a right area of the display surface DS. The central axis of the second slit pattern SP2 formed in the common electrode CE1 is spaced to the left with respect to the central axis of the first slit pattern SP1.

The distance D may be determined in consideration of a maximum misalignment distance which appears when the curved panel is formed. Since a misalignment distance varies with locations of the electrodes CE1 and PE1 on the display surface DS, the distance D may be varied with the locations of the electrodes CE1 and PE1 on the display surface DS. For example, as repeated pixel units may be divided into several groups, a sequentially increasing D value may be used for pixel groups as distances further away from the center of the display surface DS.

Since the distance D0 of the opposite corners of the rhombus form is less than the length L of the first portion 130 of the cross-shaped stem slit H5, as shown in FIGS. 8A-8C, for each pixel, at least one of the first and second holes H1 and H2 overlaps the first portion 130 of the cross-shaped stem slit H5 when the first and second substrates 100 and 500 are bent along the direction substantially parallel to the second direction Y to form the curved panel.

Figure 9:
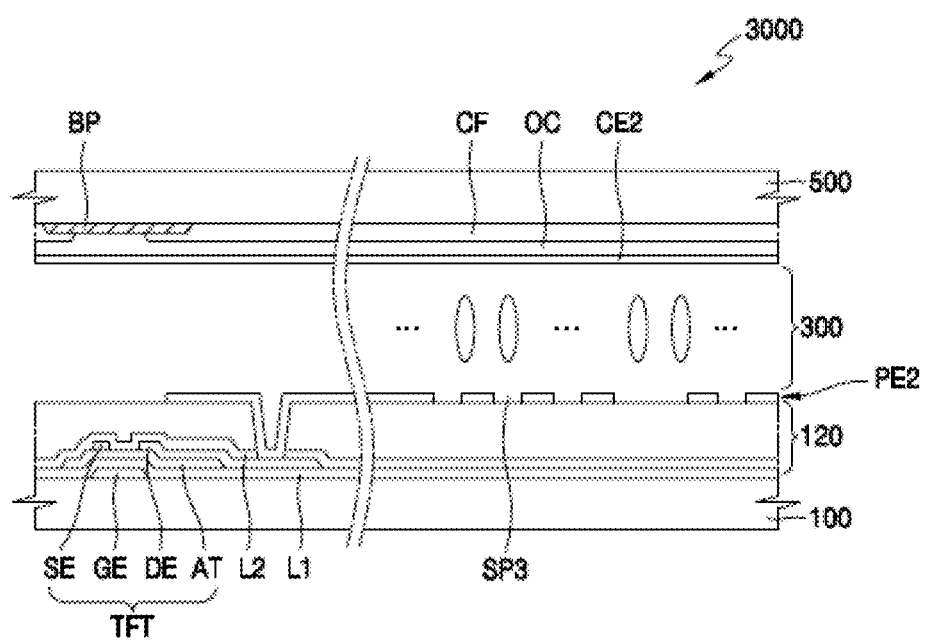
FIG. 9 is a schematic cross-sectional view of a liquid crystal display device according to another embodiment of the present invention.
Figure 10A:
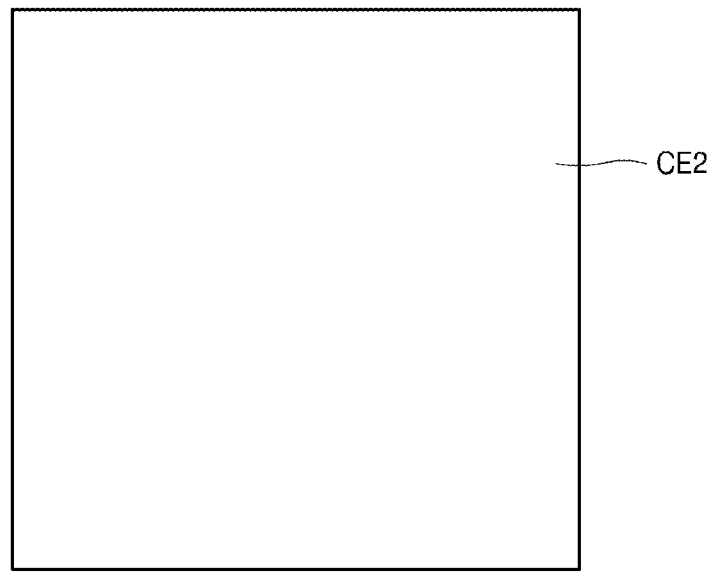
FIGS. 10A and 10B are respectively detailed plan views of a common electrode and a pixel electrode employed in the liquid crystal display device of FIG. 9.
Figure 10B:
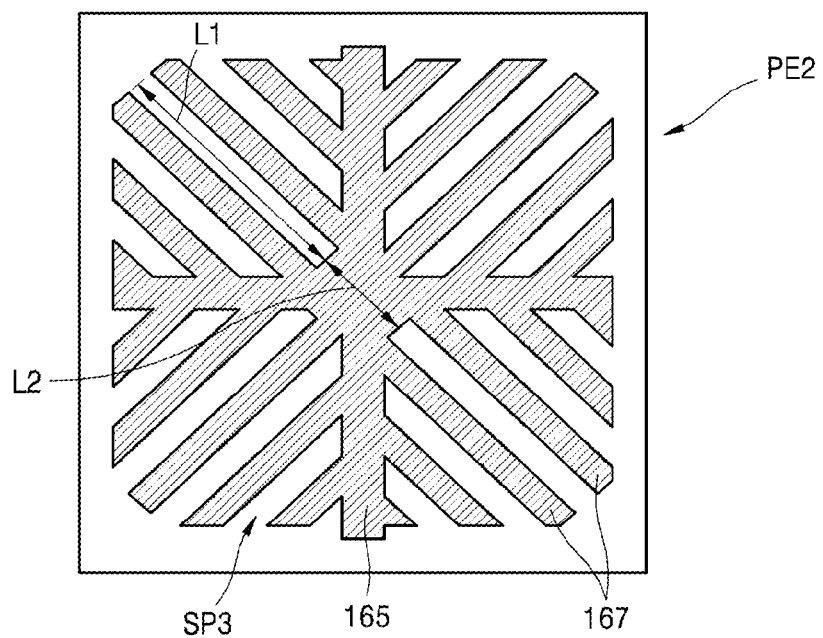

FIG. 9 is a schematic cross-sectional view of a liquid crystal display device 3000 according to another embodiment of the present invention. FIGS. 10A and 10B are respectively detailed plan views of a common electrode CE2 and a pixel electrode PE2 employed in the liquid crystal display device 3000 of FIG. 9.

The liquid crystal display device 3000 according to the present embodiment differs from the liquid crystal display device 1000 of FIG. 1 only in the detailed shapes of the common electrode CE2 and the pixel electrode PE2. The other components of the liquid crystal display device 3000 are respectively identical with the elements of the liquid crystal display device 1000 of FIG. 1.

Referring to FIG. 10A, the common electrode CE2 is a plate electrode without any hole patterns.

Referring to FIG. 10B, a slit pattern SP3 formed in the pixel electrode PE2 includes a cross-shaped stem slit 165, and a plurality of branch slits 167 extending in two directions from the stem slit 165 and disposed at alternate positions of the stem slit 165.

According to the structures of the common electrode CE2 and the pixel electrode PE2, sensitivity to misalignment may be lowered by forming the slit pattern SP3 in a shape of alternately stretching branches only in the pixel electrode PE2 without forming hole patterns in the common electrode CE2. Accordingly, these structures of the common electrode CE2 and the pixel electrode PE2 may also be applied to form curved panels. That is, although the liquid crystal display device 3000 of FIG. 9 is a flat panel, these structures may be also applied to form the curved liquid crystal display device 2000 of FIG. 7.

In the structures of the common electrode CE2 and the pixel electrode PE2 according to the present embodiment, as no patterns are formed in the common electrode CE2, the number of masks decreases in time of process and thus manufacturing costs may be reduced. In addition, a resistance of the common electrode CE2 may decrease in the case of the common electrode CE2 including no pattern than in the case of the common electrode CE2 including patterns.

Details of the pixel electrode PE2 may be modified. As shown in FIG. 10B, a central portion of the stem slit 165 may have a rhombus shape, and connected end portions of the branch slits 167 may have a quadrilateral shape. However, the present embodiment is not limited thereto. A diagonal length L2 of the central portion of the stem slit 165 may be determined in consideration of liquid crystal control in relation to a length L1 of the branch slit 167. For example, the length L1 of the branch slit 167 may be equal to or less than 35 μm, and the diagonal length L2 of the central portion in the stem slit 165 may be equal to or greater than 10 μm.

Figure 11:
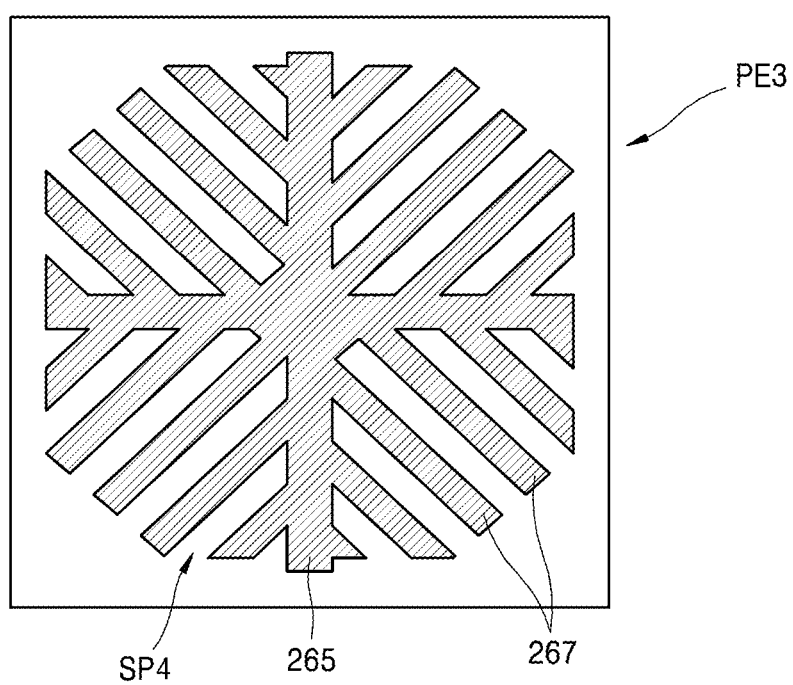
FIG. 11 is a plan view of another example of a pixel electrode which may be employed in the liquid crystal display device of FIG. 9.

FIG. 11 is a plan view of another example of a pixel electrode PE3 which may be employed in the liquid crystal display device 3000 of FIG. 9.

A slit pattern SP4 formed in the pixel electrode PE3 includes a cross-shaped stem slit 265, and a plurality of branch slits 267 extending in two directions from the stem slit 265 and disposed at alternate positions of the stem slit 265. Connected end portions of the branch slits 267 may have a chamfered quadrilateral shape.

Figure 12:
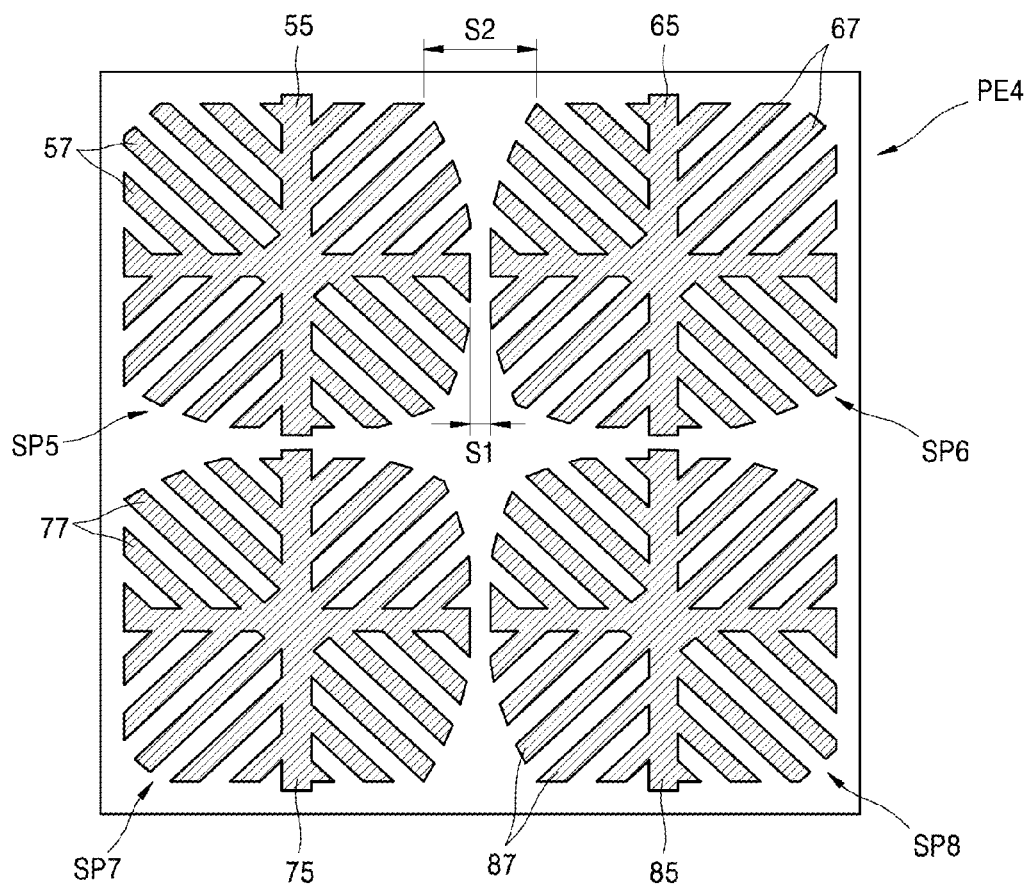
FIG. 12 is a plan view of another example of a pixel electrode which may be employed in the liquid crystal display device of FIG. 9.

FIG. 12 is a plan view of another example of a pixel electrode PE4 which may be employed in the liquid crystal display device 3000 of FIG. 9.

The pixel electrode PE4 includes a plurality of slit patterns SP5, SP6, SP7 and SP8 arranged in a matrix shape. Although the four slit patterns SP5, SP6, SP7 and SP8 are shown in FIG. 12, this is just an example and the present embodiment is not limited thereto.

The slit patterns SP5, SP6, SP7 and SP8 respectively include cross-shaped stem slits 55, 65, 75 and 85, and pluralities of branch slits 57, 67, 77 and 87 respectively extending from the stem slits 55, 65, 75, and 85 at alternate positions thereof. Distances between the branch slits 57 and 67 and 77 and 87 that face each other in the adjacent slit patterns SP5 and SP6 and SP7 and SP8 are not constant, and when end portions of the branch slits 57, 67, 77 and 87 are connected, predetermined inclined patterns are formed in regions where the slit patterns SP5, SP6, SP7 and SP8 are adjacent.

Distances between the adjacent slit patterns SP5 and SP6 and SP7 and SP8 may differ from each other such as S1 between central portions of the slit patterns SP5, SP6, SP7 and SP8 and S2 between surrounding portions of the slit patterns SP5, SP6, SP7 and SP8, and the distances may gradually increase from S1 to S2 as the distances go from the central portions to the surrounding portions.

As described above, according to one or more embodiments of the present inventive concept, a liquid crystal display device with reduced unstable texture and also reduced unstable texture increase due to misalignment may be provided.

Also, the liquid crystal display may be used to form a curved panel and may provide pictures of good quality.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present inventive concept have been described with reference to the appended figures, it will be understood by those of ordinary skill in the art that various changes in form and details may be made therein without departing from the spirit and scope of the present inventive concept as defined by the following claims.

What is claimed is:

1. A liquid crystal display device, comprising:
   a first substrate on which a pixel electrode is formed;
   a second substrate on which a common electrode is formed; and
   a liquid crystal layer disposed between the first substrate and the second substrate,
   the pixel electrode comprising:
      a first plate electrode;
      a first slit pattern which is a hole formed in the first plate electrode and comprises a cross-shaped stem slit and a plurality of branch slits extending from the stem slit; and
      a plurality of branch electrodes which protrude from outer side portions of the first plate electrode, and
   the common electrode comprising:
      a second plate electrode; and
      a second slit pattern formed in the second plate electrode and comprising a plurality of holes arranged in a rhombus form.

2. The liquid crystal display device of claim 1, wherein the common electrode and the pixel electrode are disposed such that a central axis of the first slit pattern and a central axis of the second slit pattern match each other.

3. The liquid crystal display device of claim 1, wherein holes formed at locations corresponding to corners of the rhombus form from among the plurality of holes form Y-shapes by further comprising hole regions which protrude outwards from the rhombus form.

4. The liquid crystal display device of claim 1, wherein the second slit pattern comprises four V-shaped holes respectively formed at locations corresponding to four corners of the rhombus form.

5. The liquid crystal display device of claim 4, wherein at least one of the four V-shaped holes forms a Y-shape by further comprising a hole region which protrudes outwards from the rhombus form.

6. The liquid crystal display device of claim 1, wherein the first substrate and the second substrate are curved to form a curved display surface.

7. The liquid crystal display device of claim 6, wherein the common electrode and the pixel electrode are formed such that a central axis of the second slit pattern and a central axis of the first slit pattern match each other in a central area of the display surface, and, the central axis of the second slit pattern and the central axis of the first slit pattern are separated from each other by a predetermined distance in both sides of a circumference area of the display surface.

8. The liquid crystal display device of claim 7, wherein directions of the predetermined distance at the both sides of the circumference area of the display surface are opposite to each other.

9. The liquid crystal display device of claim 8, wherein a direction of the predetermined distance in which the central axis of the second slit pattern is spaced with respect to the central axis of the first slit pattern is right in a left side of the circumference area of the display surface, and
a direction of the predetermined distance in which the central axis of the second slit pattern is spaced with respect to the central axis of the first slit pattern is left in a right side of the circumference area of the display surface.

10. The liquid crystal display device of claim 9, wherein the predetermined distance gradually increases as a location of the predetermined distance goes from the central area of the display surface to the both sides of a circumference area of the display surface.

11. A liquid crystal display device, comprising:
a first substrate on which a pixel electrode is formed;
a second substrate on which a common electrode is formed; and
a liquid crystal layer disposed between the first substrate and the second substrate,
the pixel electrode comprising a slit pattern which comprises a cross-shaped stem slit and a plurality of branch slits extending from the stem slit and disposed alternately with respect to the stem slit, and
the common electrode comprising a plate electrode without hole patterns.

12. The liquid crystal display device of claim 11, wherein a central portion of the cross-shaped stem slit has a rhombus shape.

13. The liquid crystal display device of claim 12, wherein the branch slits are equal to or less than about 35 μm in length.

14. The liquid crystal display device of claim 12, wherein a shape formed by connecting end portions of the branch slits is a quadrilateral shape.

15. The liquid crystal display device of claim 12, wherein a shape formed by connecting end portions of the branch slits is a chamfered quadrilateral shape.

16. The liquid crystal display device of claim 12, wherein the slit pattern is formed in a plurality of numbers and the plurality of slit patterns are arranged in a matrix shape.

17. The liquid crystal display device of claim 16, wherein distances between pluralities of branch slits that face each other in the adjacent slit patterns increase as the distances go from central portions of the slit patterns to circumferential portions of the slit patterns.

18. The liquid crystal display device of claim 12, wherein the first substrate and the second substrate are curved to form a curved display surface.

19. A liquid crystal display device, comprising:
a pixel electrode formed on a first substrate;
a common electrode formed on a second substrate; and
a liquid crystal layer disposed between the first substrate and the second substrate,
the pixel electrode comprising:
a first plate electrode;
a first slit pattern penetrating the first plate electrode and comprising a cross-shaped stem slit and a plurality of branch slits, the cross-shaped stem slit comprising a first portion extending along a first direction and a second portion extending along a second direction and intersected by the first portion at a center of the cross-shaped stem slit, the plurality of branch slits extending from the cross-shaped stem slit in diagonal directions of the cross-shaped stem slit; and
a plurality of branch electrodes protruding from outer portions of the first plate electrode,
the common electrode comprising:
a second plate electrode; and
a second slit pattern penetrating the second plate electrode and comprising a plurality of holes arranged in a rhombus form, the plurality of holes comprising first and second holes respectively disposed at opposite corners of the rhombus form, at least one of the first and second holes overlapping the first portion of the cross-shaped stem slit, and
the liquid crystal display device having a curved display surface by bending the first and second substrates along a direction substantially parallel to the second direction.

20. The liquid crystal display device of claim 19, wherein a distance of the opposite corners of the rhombus form is less than a length of the first portion of the cross-shaped stem slit.

* * * * *